United States Patent
Sohn et al.

(10) Patent No.: US 11,211,617 B2
(45) Date of Patent: Dec. 28, 2021

(54) FUEL CELL GENERATOR SYSTEM

(71) Applicant: KOREA INSTITUTE OF ENERGY RESEARCH, Daejeon (KR)

(72) Inventors: Young-jun Sohn, Daejeon (KR); Hwan Yeong Oh, Daejeon (KR); Dong Won Shin, Sejong-si (KR); Seung-gon Kim, Daejeon (KR); Byungchan Bae, Daejeon (KR); Min-jin Kim, Daejeon (KR); Sung-dae Yim, Daejeon (KR); Tae-hyun Yang, Daejeon (KR); Gu-gon Park, Daejeon (KR); Won-yong Lee, Daejeon (KR); Chang-soo Kim, Incheon (KR); Seok-hee Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 355 days.

(21) Appl. No.: 16/271,881

(22) Filed: Feb. 11, 2019

(65) Prior Publication Data

US 2019/0252698 A1    Aug. 15, 2019

(30) Foreign Application Priority Data

Feb. 12, 2018 (KR) .................. 10-2018-0017286

(51) Int. Cl.
*H01M 8/04119* (2016.01)
*H01M 8/04298* (2016.01)

(52) U.S. Cl.
CPC ... *H01M 8/04164* (2013.01); *H01M 8/04298* (2013.01)

(58) Field of Classification Search
CPC .................. H01M 8/04171; H01M 8/04164
See application file for complete search history.

(56) References Cited

U.S. PATENT DOCUMENTS

| 7,621,982 | B2 * | 11/2009 | Kang ................. | H01M 8/1009 96/4 |
| 2004/0197618 | A1 * | 10/2004 | Harada .................. | B01J 23/63 429/412 |
| 2019/0260056 | A1 * | 8/2019 | Yachi ................ | H01M 8/04164 |

FOREIGN PATENT DOCUMENTS

| JP | 2002095167 A | 3/2002 |
| JP | 2017183253 A | 10/2017 |
| KR | 1020100110153 A | 10/2010 |
| KR | 1020140055670 A | 5/2014 |
| KR | 1020150133416 A | 11/2015 |

(Continued)

*Primary Examiner* — Stephan J Essex
(74) *Attorney, Agent, or Firm* — Cantor Colburn LLP

(57) ABSTRACT

Disclosed is a fuel cell filter including a body including therein an internal space in which a fluid flows, an inlet port provided in the body and configured to receive a fluid discharged from a fuel cell stack, a gas-water separating membrane disposed in the internal space and configured to block a liquid fluid included in a fluid absorbed in the inlet port from flowing upwards, a discharge port provided in the body and configured to externally discharge the liquid fluid blocked in the gas-water separating membrane, a water absorbent disposed in the internal space and configured to absorb water included in a gaseous fluid passing through the gas-water separating membrane, and a gas outlet port provided in the body and configured to externally discharge gas separated in the gas-water separating membrane.

13 Claims, 3 Drawing Sheets

(56) References Cited

FOREIGN PATENT DOCUMENTS

KR 101592926 B1 2/2016
WO WO-2013046727 A1 * 4/2013 .......... H01M 8/0656

* cited by examiner

FUEL CELL GENERATOR SYSTEM

CROSS-REFERENCE TO RELATED APPLICATION(S)

This application claims the priority benefit of Korean Patent Application No. 10-2018-0017286 filed on Feb. 12, 2018, in the Korean Intellectual Property Office, the disclosure of which is incorporated herein by reference for all purposes.

BACKGROUND

1. Field

One or more example embodiments relate to a fuel cell generator system.

2. Description of Related Art

A fuel cell generates electricity while forming water through an electrochemical reaction between hydrogen and oxygen. The fuel cell converts, to an electrical form, energy generated when hydrogen and oxygen are combined. The fuel cell includes two electrodes attached to each other around an electrolyte. Through the electrochemical reaction occurring when oxygen in the air passes through one electrode and hydrogen passes through the other electrode, electricity, water, and heat may be generated.

A currently commercialized renewable energy source, such as, for example, solar power and wind power, may be a non-continuous energy source that generates energy or power only when the sun shines or the wind blows. Thus, to use this energy source in a continuous form, another method may need to be used to generate and store energy. Currently, a water electrolysis-based hydrogen generating method may be considered a most desirable power storing method.

For example, a water electrolysis may include a polymer electrolyte membrane (PEM) electrolysis using a solid polymer electrolyte (SPE) as an electrolyte. A membrane used for the PEM electrolysis may separate generated gas, and function as an ion exchanger to move a hydrogen ion from a positive electrode to a negative electrode.

The PEM electrolysis may be designed for an operating temperature of hundreds of bar to the maximum, and be designed by both a mobile system and a stationary system. However, it may require a great cost for installation, and have a relatively low capacity and efficiency.

Thus, there is a need to develop a fuel cell generator system that may store hydrogen and effectively supply hydrogen to a fuel cell using a water electrolysis, and a filter that may effectively separate water from a fluid discharged from the fuel cell.

SUMMARY

An aspect provides a fuel cell generator system.

According to an example embodiment, there is provided a fuel cell filter including a body including therein an internal space in which a fluid flows, an inlet port provided in the body and configured to receive a fluid discharged from a fuel cell stack, a gas-water separating membrane disposed in the internal space and configured to block a liquid fluid included in the fluid absorbed in the inlet port from flowing upwards, a discharge port provided in the body and configured to externally discharge the liquid fluid blocked in the gas-water separating membrane, a water absorbent disposed in the internal space and configured to absorb water included in a gaseous fluid passing through the gas-water separating membrane, and a gas outlet port provided in the body and configured to externally discharge gas separated in the gas-water separating membrane.

The gas outlet port may be provided above the inlet port.

The gas-water separating membrane may be disposed in the internal space between the gas outlet port and the inlet port.

The water absorbent may be disposed in the internal space between the gas-water separating membrane and the gas outlet port.

The discharge port may be provided at a lower end of the body.

The body may be elongated in a height direction and have a cylindrical cross section.

The body may include a membrane accommodating portion in which the gas-water separating membrane is disposed.

A portion spanning from the membrane accommodating portion to an upper end of the body may be separable from a remaining portion of the body.

The fuel cell filter may further include an upper cover detachably provided at the upper end of the body and configured to cover an upper side of the internal space.

According to another example embodiment, there is provided a fuel cell generator system including a hydrogen tank configured to store hydrogen, a fuel cell stack including a hydrogen inlet port configured to receive hydrogen from the hydrogen tank, an air inlet port configured to absorb air from outside air, a hydrogen outlet port, and an air outlet port, a fuel cell filter provided in at least one of the hydrogen outlet port or the air outlet port and configured to receive a fluid discharged through the at least one outlet port, and separate the fluid into water and gas and discharge the water and the gas separately, a water tank connected to a lower side of the fuel cell filter and configured to store water discharged from the fuel cell filter, and a water electrolysis device configured to supply, to the hydrogen tank, hydrogen generated by electrolyzing water transferred from the water tank.

The fuel cell filter of the fuel cell generator system may include a body including therein an internal space in which a fluid flows, an inlet port provided in the body and configured to receive a fluid discharged from the hydrogen outlet port of the fuel cell stack, a gas-water separating membrane disposed in the internal space and configured to block a liquid fluid included in the fluid absorbed in the inlet port from flowing upwards, a discharge port provided at a lower end of the body and configured to externally discharge the liquid fluid blocked in the gas-water separating membrane, a water absorbent disposed in the internal space and configured to absorb water included in a gaseous fluid passing through the gas-water separating membrane, and a gas outlet port provided in the body and configured to externally discharge gas separated in the gas-water separating membrane.

The fuel cell stack and the fuel cell filter may be disposed on an upper surface of the water tank, and the water electrolysis device may be disposed below the water tank.

The hydrogen tank may be disposed at a side of the water tank, the fuel cell stack, and the water electrolysis device.

The fuel cell generator system may further include a case configured to cover an outside of the fuel cell generator system.

The fuel cell stack may perform cooling using water stored in the water tank.

The water electrolysis device may be operable using electric energy generated from the fuel cell stack.

The fuel cell generator system may further include a controller configured to monitor respective states of the fuel cell stack, the hydrogen tank, the water tank, and the water electrolysis device, and control respective operations of the fuel cell stack and the water electrolysis device.

When power used in an external device connected to the fuel cell generator system is less than power generated in the fuel cell stack, the controller may control the water electrolysis device to operate using at least a portion of the generated power and control hydrogen generated by the operating to be stored in the hydrogen tank.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
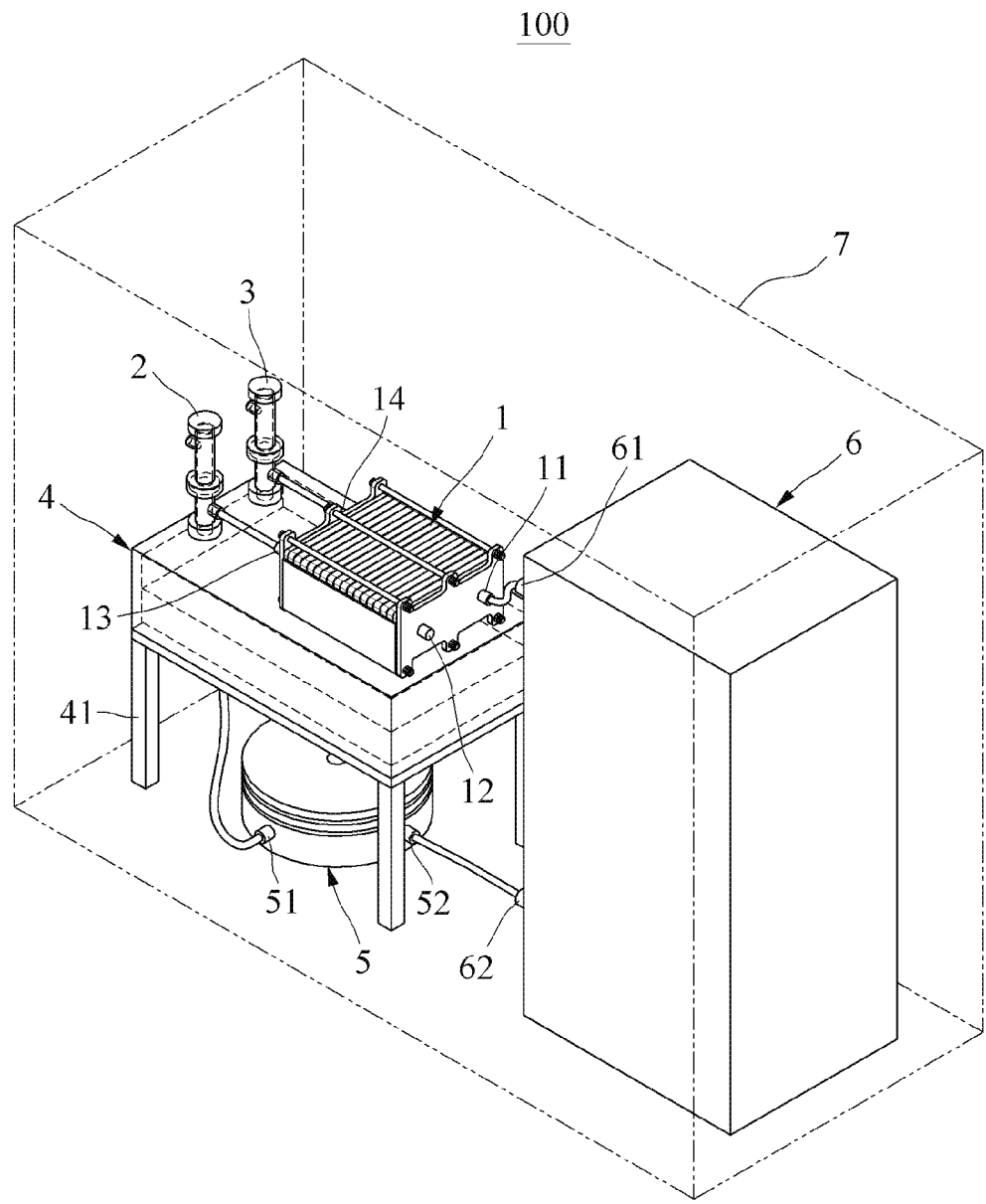
FIG. 1 is a perspective view of a fuel cell generator system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 2:
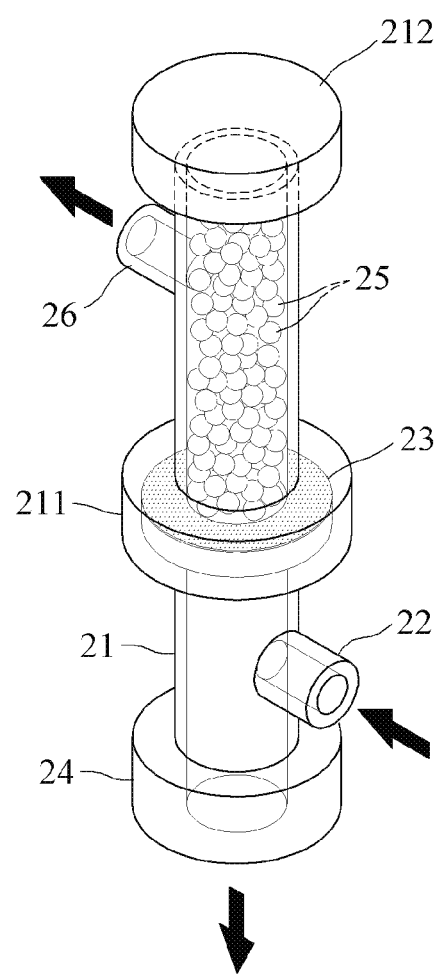
FIG. 2 is a perspective view of a fuel cell filter according to an example embodiment.
Figure 3:
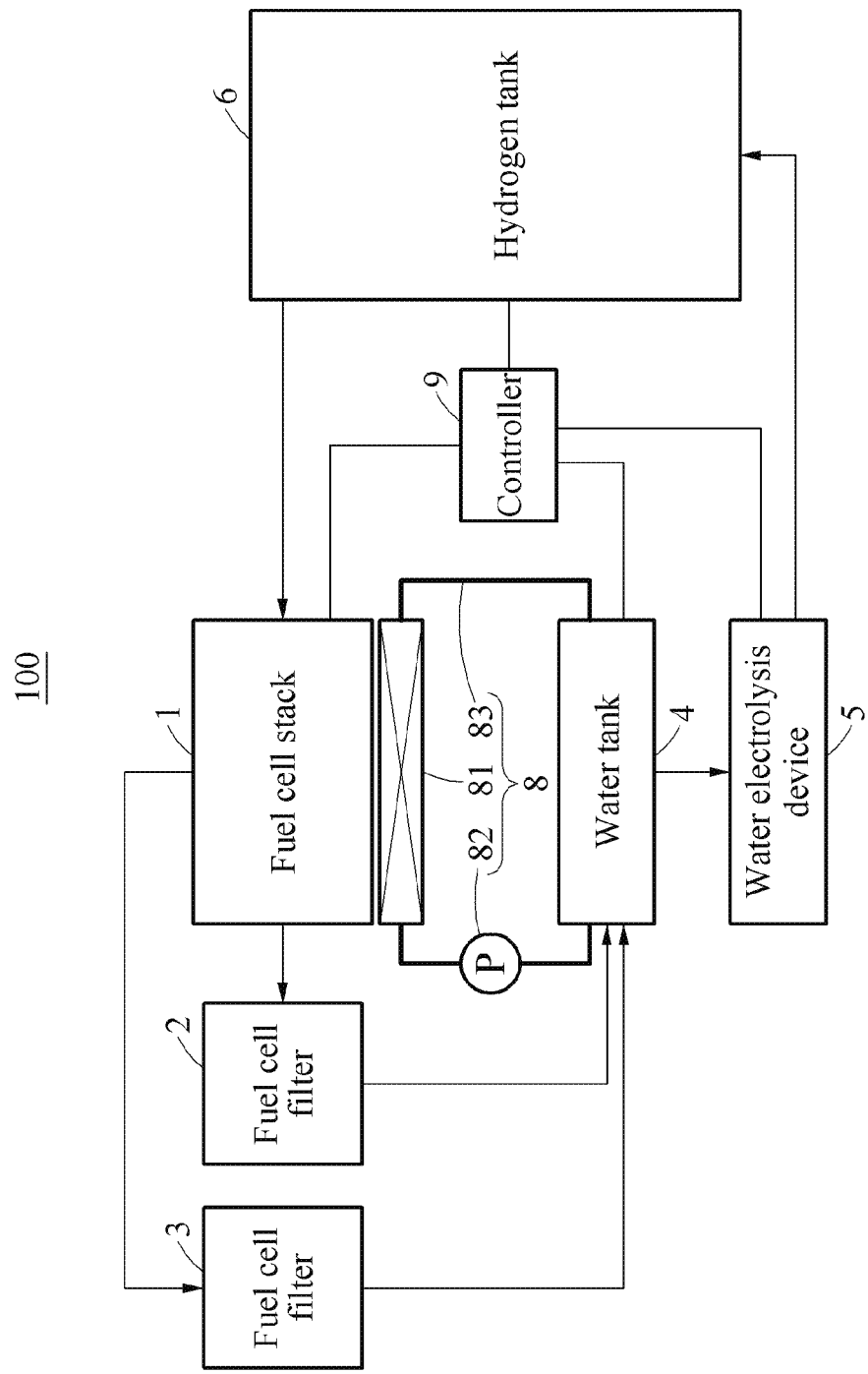
FIG. 3 is a diagram illustrating a configuration of a fuel cell generator system according to an example embodiment.

FIG. 1 is a perspective view of a fuel cell generator system according to an example embodiment. FIG. 2 is a perspective view of a fuel cell filter according to an example embodiment. FIG. 3 is a diagram illustrating a configuration of a fuel cell generator system according to an example embodiment.

Referring to FIGS. 1 through 3, a fuel cell generator system 100, which is a system for generating power using a fuel cell, includes a fuel cell stack 1, a fuel cell filter, for example, a fuel cell filter 2 and a fuel cell filter 3 as illustrated, a water tank 4, a water electrolysis device 5, a hydrogen tank 6, a case 7, a cooling device 8, and a controller 9.

The fuel cell stack 1 is provided in a structure in which a plurality of fuel cells configured to generate electric energy through oxidation-reduction reactions using hydrogen and oxygen are stacked, and configured to generate electric energy and then generate and discharge excess gas and water.

The fuel cell stack 1 includes a hydrogen inlet port 11, an air inlet port 12, a hydrogen outlet port 14, and an air outlet port 13.

The hydrogen inlet port 11 is configured to receive hydrogen from an outside. For example, the hydrogen inlet port 11 is connected to a hydrogen output port 61 of the hydrogen tank 6 through a pipe connecting member, for example, a hose.

Herein, ports such as the hydrogen inlet port 11 that are provided to transfer a fluid may be connected through a connecting member such as a hose, and the ports may also be connected thereto directly. A detailed description of such a connection is omitted here.

The air inlet port 12 is configured to absorb external air to receive oxygen in the air.

The hydrogen outlet port 14 is connected to the hydrogen inlet port 11 and configured to discharge, from the fuel cells, hydrogen remained after a chemical reaction and water generated after the chemical reaction.

The air outlet port 13 is connected to the air inlet port 12 and configured to discharge, from the fuel cells, gas remained after a chemical reaction and water generated after the chemical reaction.

The fuel cell filter may be connected to at least one of the air outlet port 13 or the hydrogen outlet port 14 and configured to absorb a fluid including liquid from the at least one outlet port and separate the liquid and gas to discharge them separately.

For example, the fuel cell filter may include the fuel cell filter 2 connected to the air outlet port 13 and the fuel cell filter 3 connected to the hydrogen outlet port 14 as illustrated. The two fuel cell filters 2 and 3 may have the same configuration.

The fuel cell filter, for example, the fuel cell filter 2, may be provided at one of the air outlet port 13 and the hydrogen outlet port 14 of the fuel cell stack 1. For example, the fuel cell filter 2 may be provided at the air outlet port 13.

The fuel cell filter 2 includes a body 21, a fluid inlet port 22, a gas-water separating membrane 23, a discharge port 24, a water absorbent 25, and a gas outlet port 26.

The body 21 forms an outer shape of the fuel cell filter 2, and includes therein an internal space in which a fluid flows. For example, the body 21 may be provided in a cylindrical shape elongated vertically as illustrated in FIG. 2. However, the shape of the body 21 is not limited to the example shape described in the foregoing, and thus the body 21 may be provided in various shapes. The body 21 includes a membrane accommodating portion 211 and an upper cover 212.

The membrane accommodating portion 211 accommodates the gas-water separating membrane 23. For example, the membrane accommodating portion 211 is formed to have a diameter or a width that is greater than that of another portion of the body 21. Thus, the gas-water separating membrane 23 having a diameter or a width greater than that of a flow channel inside the body 21 may be disposed in the membrane accommodating portion 211. Through such a structure, it is possible to prevent a fluid flowing in through the fluid inlet port 22 from bypassing the gas-water separating membrane 23 and then being discharged to the gas outlet port 26.

For example, the body 21 may be separated into an upper portion and a remaining lower portion from the membrane accommodating portion 211 as a boundary. For example, the upper portion and the lower portion of the body 21 may be attached to each other and detached from each other through a screw connection or an interference fit. Thus, the gas-water separating membrane 23 may be more readily installed, removed, or replaced.

The upper cover 212 forms an upper end of the body 21 to cover an upper side of the internal space and a remaining portion of the body 21. The upper cover 212 may be attached to and detached from the remaining portion of the body 21 through a screw connection or an interference fit. Thus, the water absorbent 25 may be more readily installed, removed, or replaced.

The fluid inlet port 22 is connected to the air outlet port 13 of the fuel cell stack 1, and configured to absorb a fluid discharged from the air outlet port 13 and guide the fluid into the internal space of the body 21.

The gas-water separating membrane 23 is accommodated in the internal space of the body 21, for example, the membrane accommodating portion 211. The gas-water separating membrane 23 may be a thin membrane configured to block a liquid fluid in the fluid absorbed through the inlet port 22 from flowing and allow gas to flow. That is, the gas-water separating membrane 23 may allow only gas included in gas including water to pass therethrough.

The gas-water separating membrane 23 is disposed above the inlet port 22. Thus, the liquid fluid flowing in through the inlet port 22 may not flow upwards.

In addition, the gas-water separating membrane 23 may be a cylindrical membrane having a diameter greater than a width of the internal space in which a fluid flows as illustrated in FIG. 2.

The discharge port 24 is configured to discharge the liquid fluid in the fluid absorbed through the inlet port 22, for example, water. The discharge port 24 is disposed on a lower side of the body 21. For example, the discharge port 24 may be disposed below the inlet port 22, and thus may naturally discharge the liquid fluid absorbed through the inlet port 22, for example, water, by a force of gravity.

The water absorbent 25 is configured to absorb gaseous water from gas separated from the fluid absorbed through the inlet port 22 while the fluid is passing through the gas-water separating membrane 23.

The water absorbent 25 is provided in the internal space disposed above the gas-water separating membrane 23. For example, the water absorbent 25 may include a polymer compound including silica gel, or calcium chloride.

The gas outlet port 26 is provided to externally discharge gas separated while the fluid absorbed through the inlet port 22 is passing through the gas-water separating membrane 23 and the water absorbent 25, and connects the internal space to an outside of the body 21.

For example, the gas outlet port 26 may be disposed above the gas-water separating membrane 23 and at least a portion of the water absorbent 25 as illustrated in FIG. 2. For example, an additional membrane or mesh-type member may be provided between the gas outlet port 26 and the internal space to prevent the water absorbent 25 from leaking out through the gas outlet port 26.

The fuel cell filter 3 connected to the hydrogen outlet port 14 may be provided in a same structure as that of the fuel cell filter 2 connected to the air outlet port 13, and thus a detailed description of the fuel cell filter 3 is omitted here.

The water tank 4 is provided as a container-type storage device configured to store therein water discharged from the fuel cell filter, for example, the fuel cell filter 2 and the fuel cell filter 3. For example, as illustrated, the water tank 4 may be separated from a floor surface through a water tank support 41 while being supported by the water tank support 41.

For example, the fuel cell stack 1 and the fuel cell filter, for example, the fuel cell filter 2 and the fuel cell filter 3, may be disposed on an upper surface of the water tank 4. For example, the discharge port 24 of the fuel cell filter 2 may be connected to the upper surface of the water tank 4 such that water discharged from the discharge port 24 flows into the water tank 4.

Thus, water flowing into the fuel cell filter may naturally flow into the water tank 4 by a force of gravity. In addition, the fuel cell stack 1 is disposed on the upper surface of the water tank 4, and it is thus possible to cool heat generated in the fuel cell stack 1 using water in the water tank 4.

The water electrolysis device 5 is configured to electrolyze water using electric energy to decompose the water into hydrogen and oxygen, and receive water from the water tank 4 connected thereto and transfer the hydrogen obtained through the electrolyzing to the hydrogen tank 6. A chemical reaction occurring in the water electrolysis device 5 may be an endothermic reaction. Thus, when the water electrolysis device 5 is disposed adjacent to the water tank 4, the water electrolysis device 5 may absorb heat in the water tank 4 heated by receiving heat generated in the fuel cell stack 1. That is, by disposing the water electrolysis device 5 to be adjacent to the water tank 4, the water tank 4 may cool the fuel cell stack 1 more effectively.

The water electrolysis device 5 includes a water inlet port 51 configured to receive water from the water tank 4, and a hydrogen transfer port 52 configured to transfer hydrogen obtained through the electrolyzing to the hydrogen tank 6.

For example, the water electrolysis device 5 is disposed in a space between the floor surface and the water tank 4, and may thus naturally receive water from the water tank 4 through the water inlet port 51 by a force of gravity.

For example, the water electrolysis device 5 may receive electric energy from the fuel cell stack 1 and electrolyze water.

The hydrogen tank 6 is provided as a container-type storage device to store hydrogen and configured to charge hydrogen to transfer the hydrogen to the fuel cell stack 1, and receive hydrogen from the water electrolysis device 5.

For example, the hydrogen tank 6 is disposed at a side of the fuel cell stack 1, the water tank 4, and the water electrolysis device 5. Through such a structure, it is possible to reduce a path of a hydrogen transfer channel through which hydrogen is transferred from the hydrogen tank 6 to the fuel cell stack 1, and reduce a path of a hydrogen transfer channel through which hydrogen is transferred from the water electrolysis device 5 to the hydrogen tank 6. In addition, an overall shape of the fuel cell generator system 100 may be designed to be a rectangular shape as illustrated in FIG. 1, and it is thus possible to improve space efficiency.

The hydrogen tank 6 includes a hydrogen output port 61 and a hydrogen charging port 62.

The hydrogen output port 61 is provided to transfer hydrogen in the hydrogen tank 6 to the fuel cell stack 1, and connected to the hydrogen inlet port 11 of the fuel cell stack 1 to supply hydrogen thereto.

The hydrogen charging port 62 is provided to receive hydrogen generated from the water electrolysis device 5, and connected to the hydrogen transfer port 52 of the water electrolysis device 5 to receive hydrogen generated from the water electrolysis device 5.

As described above, based on a positional relationship among the fuel cell stack 1, the fuel cell filter, the water tank 4, the water electrolysis device 5, and the hydrogen tank 6, it is possible to form an overall configuration of the fuel cell generator system 100 to be more compact by disposing the fuel cell stack 1, the fuel cell filter, and the water electrolysis device 5 above and below the water tank 4. Thus, a size of the fuel cell generator system 100 may be more readily reduced, and a space occupied by the hydrogen tank 6 may be more expanded sufficiently.

In addition, the fuel cell filter, the water tank 4, and the water electrolysis device 5 are disposed in a direction from top to bottom, and thus water discharged from the fuel cell filter and the water tank 4 may naturally flow into the water tank 4 and the water electrolysis device 5, respectively, by a force of gravity.

The case 7 is provided as a box-shaped container to enclose an outside of components described above including the fuel cell stack 1, the fuel cell filter, the water tank 4, the water electrolysis device 5, and the hydrogen tank 6, and a bottom of the fuel cell generator system 100.

Although the fuel cell generator system 100 is embodied along with the case 7 as illustrated in FIG. 1, the fuel cell generator system 100 may also be embodied without the case 7.

Referring to FIG. 3, the fuel cell generator system 100 includes the cooling device 8. The cooling device 8 is configured to cool heat generated in the fuel cell stack 1 using water stored in the water tank 4. For example, the cooling device 8 may be disposed outside or inside the fuel cell stack 1 to perform cooling on the fuel cell stack 1.

The cooling device 8 includes a cooling channel 83, a heat exchanger 81, and a water pump 82.

The cooling channel 83 is provided as a separate tube or hose to allow water stored in the water tank 4 to be circulated outside the water tank 4. The heat exchanger 81 and the water pump 82 are connected on a path of the cooling channel 83.

The heat exchanger 81 comes into contact with an inside or an outside of the fuel cell stack 1 to absorb heat generated from the fuel cell stack 1.

The water pump 82 is configured to transfer water stored in the water tank 4 to the cooling channel 83. For example, the water pump 82 may operate by receiving electric energy from the fuel cell stack 1.

Alternatively, water stored in the water tank 4 may be supplied directly to a cooling channel formed inside the fuel cell stack 1. It is possible to cool the fuel cell stack 1 by disposing the fuel cell stack 1 to be adjacent to the water tank 4 without an additional cooling device, for example, the cooling device 8. Thus, the fuel cell generator system 100 may perform such cooling using water stored in the water tank 4 through various methods as described above.

The controller 9 may be a controller device including a plurality of input and output channels and a plurality of sensors. The controller 9 is configured to control respective operational states of the fuel cell stack 1 and the water electrolysis device 5, and monitor respective charging states or amounts of the fuel cell stack 1, the water tank 4, and the hydrogen tank 6.

The controller 9 is configured to monitor the charging states or amount of the fuel cell stack 1, the water tank 4, and the hydrogen tank 6, and determine the operational states of the fuel cell stack 1 and the water electrolysis device 5 or determine whether to operate the fuel cell stack 1 and the water electrolysis device 5.

For example, when power used in an external device connected to the fuel cell generator system 100 is less than power generated in the fuel cell stack 1, the controller 9 may operate the water electrolysis device 5 using at least a portion of the generated power to charge the hydrogen tank 6 with hydrogen.

According to example embodiments described herein, a fuel cell filter may effectively separate water included in a fluid discharged from a fuel cell stack. Thus, it is possible to prevent humidity in a space in which the fuel cell stack is provided from increasing and also improve a recovery rate of water to be recovered into a water tank and to be transferred to a water electrolysis device.

According to example embodiments described herein, a fuel cell generator system may store hydrogen by operating a water electrolysis device using electric energy overproduced in a fuel cell stack, and may thus be highly effective.

According to example embodiments, a fuel cell generator system may include a fuel cell stack, a fuel cell filter, and a water electrolysis device which are disposed above and below a water tank, and thus be compactly formed. Thus, it may be effective to reduce an entire size of the fuel cell generator system, and sufficiently expand a space occupied by a hydrogen tank.

According to example embodiments described herein, a fuel cell generator system may include a fuel cell filter, a water tank, and a water electrolysis device which are arranged along a direction from top to bottom, and thus water may naturally flow by a force of gravity without an additional power generating source.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A fuel cell filter comprising:
a body including therein an internal space in which a fluid flows;
an inlet port provided in the body and configured to receive a fluid discharged from a fuel cell stack;
a gas-water separating membrane which is disposed in the internal space, extends horizontally, divides the internal space into a lower internal space and an upper internal space, and is configured to block a liquid fluid included in the fluid absorbed in the inlet port from flowing upwards, wherein the lower internal space is disposed below a lower surface of the gas-water separating membrane, the upper internal space is disposed above an upper surface of the gas-water separating membrane, and the upper surface is opposite to the lower surface;
a discharge port provided in the body, directly connected to the lower inner space, and configured to externally discharge the liquid fluid blocked in the gas-water separating membrane;
a water absorbent disposed in the upper internal space and configured to absorb water included in a gaseous fluid passing through the gas-water separating membrane; and
a gas outlet port provided in the body, directly connected to the upper inner space, and configured to externally discharge gas separated in the gas-water separating membrane,
wherein the inlet port is directly connected to the lower inner space.

2. The fuel cell filter of claim 1,
the water absorbent is disposed between the gas-water separating membrane and the gas outlet port.

3. The fuel cell filter of claim 1, wherein the discharge port is provided at a lower end of the body.

4. The fuel cell filter of claim 1, wherein the body is elongated in a height direction and has a cylindrical cross section.

5. The fuel cell filter of claim 2, wherein the body includes a membrane accommodating portion in which the gas-water separating membrane is disposed.

6. The fuel cell filter of claim 5, wherein a portion spanning from the membrane accommodating portion to an upper end of the body is separable from a remaining portion of the body.

7. The fuel cell filter of claim 2, further comprising:
an upper cover detachably provided at an upper end of the body and configured to cover an upper side of the internal space.

8. A fuel cell generator system comprising:
a hydrogen tank configured to store hydrogen;
a fuel cell stack including a hydrogen inlet port configured to receive hydrogen from the hydrogen tank, an air inlet port configured to absorb air from outside air, a hydrogen outlet port, and an air outlet port;
a fuel cell filter provided in at least one of the hydrogen outlet port or the air outlet port and configured to receive a fluid discharged through the at least one outlet port, and separate the fluid into water and gas and discharge the water and the gas separately;
a water tank disposed below and connected to a lower side of the fuel cell filter and configured to receive and store water discharged downward from the fuel cell filter by a force of gravity; and
a water electrolysis device disposed below and adjacent to the water tank and configured to absorb heat in the water tank and supply, to the hydrogen tank, hydrogen generated by electrolyzing water transferred below from the water tank by the force of gravity,
wherein the water tank is disposed below and adjacent to a lower surface of the fuel cell stack to perform cooling of the fuel cell stack using water stored therein.

9. The fuel cell generator system of claim 8, wherein the fuel cell filter includes:
a body including therein an internal space in which a fluid flows;
an inlet port provided in the body and configured to receive a fluid discharged from the hydrogen outlet port of the fuel cell stack;
a gas-water separating membrane disposed in the internal space and configured to block a liquid fluid included in the fluid absorbed in the inlet port from flowing upwards;
a discharge port provided at a lower end of the body and configured to externally discharge the liquid fluid blocked in the gas-water separating membrane;
a water absorbent disposed in the internal space and configured to absorb water included in a gaseous fluid passing through the gas-water separating membrane; and
a gas outlet port provided in the body and configured to externally discharge gas separated in the gas-water separating membrane.

10. The fuel cell generator system of wherein the hydrogen tank is disposed at a side of the water tank, the fuel cell stack, and the water electrolysis device.

11. The fuel cell generator system of claim 8, further comprising:
a case configured to cover an outside of the fuel cell generator system.

12. The fuel cell generator system of claim 8, wherein the water electrolysis device is operable using electric energy generated from the fuel cell stack.

13. The fuel cell generator system of claim 12, further comprising:
- a controller configured to monitor respective states of the fuel cell stack, the hydrogen tank, the water tank, and the water electrolysis device, and control respective operations of the fuel cell stack and the water electrolysis device,
  - wherein, when power used in an external device connected to the fuel cell generator system is less than power generated in the fuel cell stack, the controller is configured to control the water electrolysis device to operate using at least a portion of the generated power and control hydrogen generated by the operating to be stored in the hydrogen tank.

* * * * *